Patented Apr. 26, 1938

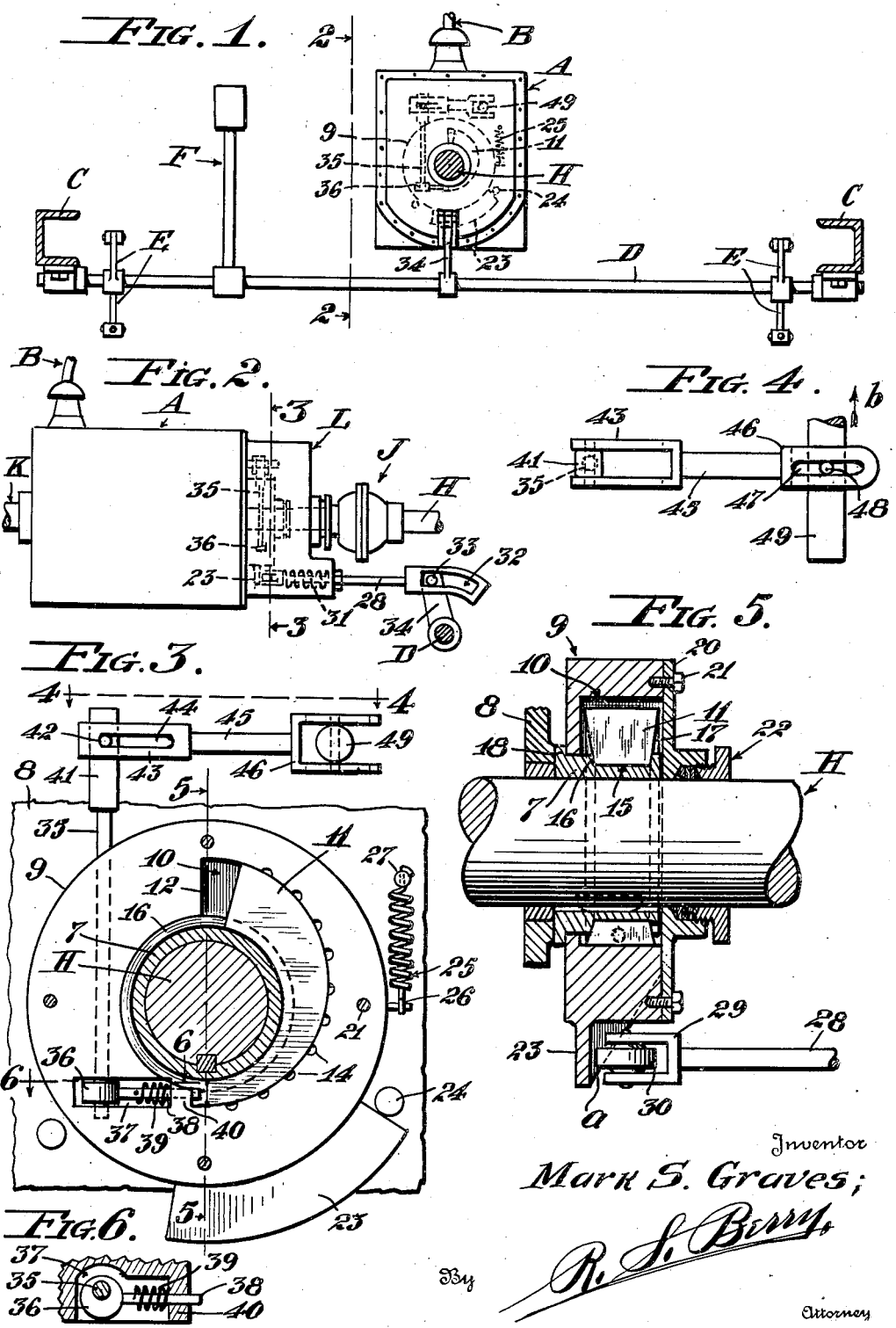

2,115,364

UNITED STATES PATENT OFFICE 2,115,364

VEHICLE SAFETY BRAKE

Mark S. Graves, Los Angeles, Calif.

Application April 17, 1937, Serial No. 137,487

9 Claims. (Cl. 192—4)

This invention relates to a brake and more particularly pertains to a vehicle brake for preventing unwanted retrograde movement of a vehicle; the present invention being an improvement in the vehicle safety brake set forth in United States Letters Patent Number 2,061,029, issued to me November 17, 1936.

An object of the invention is to provide a construction in a brake of the above character whereby extremely slight reverse turning movement of the vehicle drive shaft under the influence of the vehicle wheels will effect application of the vehicle wheel brakes so as to inhibit backward movement of the vehicle, and in which means are provided for automatically placing the anti-reversing mechanism out of operative relation to the vehicle brakes on placing the vehicle driving mechanism in reverse.

Another object is to provide an automatic brake applicator in association with a vehicle drive shaft which while adapted to effect application of the vehicle wheel brake on unwanted reverse operation of the drive shaft will not interfere with the normal operation of the brake mechanism in the usual fashion by the vehicle operator.

Another object is to provide a construction in the automatic brake applicator in which after the brakes have been automatically applied, through slight retrograde movement of the vehicle drive shaft, release of the brakes will be effected by rotating the drive shaft in a forward direction.

Another object is to provide a brake mechanism of the above character in which the actuator is formed as to have a wide area of surface contact with the drive shaft, and so constructed and arranged as to be instantly influenced by movement of the shaft.

With the foregoing objects in view, together with such other objects and advantages as may subsequently appear, the invention is carried into effect as illustrated by way of example in the accompanying drawing, in which:

Fig. 1 is a view in transverse section of a vehicle frame with a transmission gear housing and a brake rock shaft shown in rear elevation;

Fig. 2 is a detail in section and elevation taken on the line 2—2 of Fig. 1;

Fig. 3 is an enlarged detail in section and elevation as seen on the line 3—3 of Fig. 2 in the direction indicated by the arrows;

Fig. 4 is a detail plan view taken on the line 4—4 of Fig. 3;

Fig. 5 is a view in section and elevation taken on the line 5—5 of Fig. 3;

Fig. 6 is a detail in horizontal section taken on the line 6—6 of Fig. 3.

Referring to the drawing more specifically A indicates generally a transmission gear housing of a motor vehicle which is fitted with the usual transmission gears not necessary to be here shown adapted to be shifted by a gear shift lever B in conventional fashion. C indicates the side frames of the vehicle on which is carried a rock shaft D fitted with arms E connecting with the vehicle wheel brakes in the usual manner for effecting application and release of the brakes on turning the rock shaft D. As here shown the shaft D is fitted with a foot lever F whereby the shaft D may be manually actuated in effecting application of the vehicle brakes in a fashion well known in the operation of motor vehicles.

Leading from the transmission gear housing A is a vehicle drive shaft H fitted with the conventional universal joint J and which shaft is driven in forward or rearward movement from an engine K under the control of the transmission gears in the housing A in the usual manner.

In carrying out the present invention the shaft H is fitted with a collar 7 affixed thereon adjacent the rear end wall 8 of the housing A, and loosely encircling the collar 7 is a ring 9 formed on its inner periphery with a recess 10 extending circumferentially of the collar substantially one half the periphery thereof, which recess is tapered longitudinally and is arranged with its large end portion at the upper side portion of the collar and its reduced end portion extending beneath the collar. The recess 10 opens to the front of the ring.

Mounted within the recess 10 is an arcuate wedge 11 the inner periphery of which normally contacts the outer periphery of the collar 7 and conforms thereto and the outer periphery of which wedge slidably contacts the arcuate outer wall of the recess 10. The upper enlarged end of the wedge 11 is normally spaced a short distance from the upper end wall 12 of the recess 10 and the lower end of the wedge is slightly spaced from the lower end wall of the recess 10. The recess 10 is designed to be packed with lubricant, and as a means for affording lubrication of the contacting surfaces of the wedge and the ring the latter is formed on the arcuate outer wall of the recess 10 with a series of transverse grooves 14.

The collar 7 is formed with a circumferentially extending channel 15 in which the inner arcuate marginal portion of the wedge 11 seats; the side walls 16 of which channel are inclined rearwardly from the bottom wall of the channel thus forming the latter of wedge-shaped cross section. The arcuate wedge 11 has its side walls 17 inclined and arranged to slidably conform to the channel side walls 16; the wedge 11 thus being wedge-shaped transversely as well as longitudinally. The collar 7 is formed on its inner end with a flange 18 against which the rear face of the ring 9 abuts.

A cover plate 20 is mounted on the outer face of the ring 9 which cover plate encircles the shaft H and is detachably secured to the ring by screws 21; the cover plate being fitted with a packing gland 22 and encompassing the shaft.

Formed on the downwardly extending portion of the ring 9 is a flange 23 which extends diagonally of the circumference of the ring to present a face a inclined relative to a plane extending at right angles to the axis of the shaft H.

Mounted on the end wall 8 of the housing a is a pin 24 projecting rearwardly in front of the outer end portion of the flange 23, which pin constitutes a stop and against which the flange 23 abuts under the urge of a spring 25 one end of which is attached to the periphery of the ring 9 at 26 and the other end of which is affixed to the wall 8 at 27; the spring 25 serving as a means to yieldably resist rotation of the ring 9 in a direction corresponding to the direction of reverse rotation of the shaft H.

Mounted on the end wall 8 of the housing A is a casing L which encompasses the ring 9 and mounted on the casing is a reciprocal slide bar 28 fitted at one end with a yoke 29 carrying a roller 30 which normally seats against the inclined face a of the flange 23 under the urge of a spring 31 interposed between the end wall of the housing I and the yoke 29 as particularly shown in Fig. 2. The outer end of the slide bar 28 is formed with an arcuate slot 32 in which extends a pin 33 on an arm 34 carried by the rock shaft D; the inner end of the slot 32 being positioned adjacent the pin 33 when the rock shaft D is in its normal position as shown in Fig. 2 and the opposed end of the slot being spaced from the pin 33 such distance as to permit rocking of the shaft D in effecting application of the vehicle brakes through the medium of the lever F. The inclination of the flange 23 is such that on turning the ring 9 in opposition to the spring 25 the slide bar 28 will be advanced in opposition to the spring 31 sufficiently to rock the shaft D and effect application of the vehicle brakes.

The wedge 11 normally gravitates into superficial contact with the collar 7 and with the arcuate outer face of the recess 10, so that reverse rotation of the shaft H will cause the wedge to effect frictional wedge connection between the sleeve 7 and the ring 9 such as to effect turning movement of the ring in opposition to the spring 25.

Since it is desirable to permit retrograde movement of the shaft H when it is desired to propel the vehicle rearwardly means are provided for shifting the wedge 11 out of operative relation to the shaft H and ring 9 when the motor vehicle transmission is disposed in reverse. This means as here shown embodies a rock shaft 35 carried by the ring 9 and extending downwardly into the upper peripherial portion thereof, and which shaft is fitted at its lower end portion with a cam 36 arranged in a recess 37 formed in the ring against which cam bears a reciprocal pin 38 under the urge of a spring 39; the pin 38 passing through and guided in an opening in a wall 40 separating the recess 37 from the lower end of the recess 10; the outer end of the pin 38 being normally spaced a short distance from the lower end of the wedge 11. The upper end of the rock shaft 35 is fitted with a flat sided head 41 which is connected by a pivot pin 42 in a yoke 43 having elongated slots 44 in the side members thereof in which the pivot pin 42 is disposed, which connection permits the upper portion of the rock shaft 35 to be moved in the direction of the length of the yoke 43 on turning the ring 9. The yoke 43 is carried on a shank 45 fitted on a yoke 46 having longitudinally extending slots 47 engaging a pivot pin 48 carried on a slide bar 49 which latter extends into the transmission gear housing A and is connected to the usual shiftable reverse gear in the latter. The slot 47 serves to permit lateral movement of the yoke 46 with the axis of the shaft 35 as a pivot on advancing the slide bar 49 in the direction of the arrow b in Fig. 4.

When the slide bar 49 is in neutral position the cam 36 is disposed in the position shown in Fig. 6, that is with the high or dwell portion of the cam off-set to one side of the pin 38 whereby the latter is disposed in a retracted position under the urge of the spring 39. On the slide bar 49 being advanced to a low position the shaft 35 is turned in a direction to move the high or dwell portion of the cam 36 away from the pin 38. On advancing the slide bar 49 into the reverse position the high portion of the cam 36 is moved in a direction to advance the pin 38 in opposition to the spring 39.

In the operation of the invention the shaft H on revolving in a forward direction, that is counter-clockwise as viewed in Fig. 3, the wedge 11 will be moved upwardly in the recess 10 under the urge of frictional contact between the collar 7 and the inner periphery of the wedge.

In event of retrograde movement of the shaft H as under the influence of the vehicle wheels in event the vehicle accidentally starts to roll backward on a grade, a very slight movement of the shaft H will under the urge of its frictional engagement with the wedge 11 coupled with the normal gravitational movement of the latter, cause the wedge to effect a connection between the collar 7 and the ring 9 so as to cause the latter to turn a short distance with the shaft H such that the inclined flange 23 will act through the slide bar 28 to apply the vehicle brakes and thereby prevent further backward movement of the vehicle and thus stopping the rearward rotation of the shaft H. This having occurred, when it is desired to release the brakes the shaft H is rotated slightly in a forward direction, as through the engine shaft K, or moving the vehicle forward while in forward gear, thus moving the wedge 11 out of operative connection between the collar 7 and ring 9 and permitting the spring 25 to restore the ring 9 to normal and thus permitting the release of the vehicle brakes.

When it is desired to drive the vehicle in reverse it is necessary to place the wedge 11 out of operative relation with the collar and ring. As before stated this is accomplished by advance movement of the transmission slide bar 49, when placing the transmission gears in reverse, which movement of the bar 49 swings the yokes 46 and 43 so as to turn the shaft 35 through the head 41 in a direction to cause the cam 36 to advance the pin 38 in opposition to spring 39 into engagement with the lower end of the wedge II and to exert an upward thrust on the latter sufficiently to prevent its inter-connection between the collar and ring.

While I have shown and described a specific embodiment of my invention I do not limit myself to the exact details of construction and arrangement shown, and accordingly the invention embraces such changes and modifications as come within the meaning and scope of the appended claims.

I claim:

1. In a vehicle safety brake in association with the vehicle brake operating rock shaft and the vehicle drive shaft, a ring loosely encircling the drive shaft having a tapered recess on its inner periphery and arranged with its enlarged end extending upwardly above the shaft and its reduced end extending downwardly below the shaft, an arcuate tapered wedge arranged in said recess with its enlarged end uppermost, said wedge being free in said recess for longitudinal movement therein and to gravitate to its lowermost position, a collar on said shaft with which the inner arcuate face of said wedge is frictionally engageable to effect inter-engagement between said shaft and ring on retrograde movement of said shaft, a slide bar, connections between said slide bar and the brake rock shaft, and means on said ring engageable with said slide bar for shifting the latter on turning said ring under the influence of said drive shaft.

2. In a vehicle safety brake in association with the vehicle brake operating rock shaft and the vehicle drive shaft, a ring loosely encircling the drive shaft having a tapered recess on its inner periphery and arranged with its enlarged end extending upwardly above the shaft and its reduced end extending downwardly below the shaft, an arcuate tapered wedge arranged in said recess with its enlarged end uppermost, said wedge being free in said recess for longitudinal movement therein and to gravitate to its lowermost position, a collar on said shaft with which the inner arcuate face of said wedge is frictionally engageable to effect inter-engagement between said shaft and ring on retrograde movement of said shaft, a slide bar, connections between said slide bar and the brake rock shaft, means on said ring engageable with said slide bar for shifting the latter on turning said ring under the influence of said drive shaft, and spring means yieldably opposing turning movement of said ring under the influence of said wedge arranged to restore said ring to normal on disengagement of the wedge from said ring.

3. In a vehicle safety brake in association with the vehicle brake operating rock shaft and the vehicle drive shaft, a ring loosely encircling the drive shaft having a tapered recess on its inner periphery and arranged with its enlarged end extending upwardly above the shaft and its reduced end extending downwardly below the shaft, an arcuate tapered wedge arranged in said recess with its enlarged end uppermost, said wedge being free in said recess for longitudinal movement therein and to gravitate to its lowermost position, a collar on said shaft with which the inner arcuate face of said wedge is frictionally engageable to effect inter-engagement between said shaft and ring on retrograde movement of said shaft, a slide bar, connections between said slide bar and the brake rock shaft, and an inclined face on said ring engageable with said slide bar for shifting the latter to actuate the brake rock shaft.

4. In a vehicle safety brake in association with the vehicle brake operating rock shaft and the vehicle drive shaft, a ring loosely encircling the drive shaft having a tapered recess on its inner periphery and arranged with its enlarged end extending upwardly above the shaft and its reduced end extending downwardly below the shaft, an arcuate tapered wedge arranged in said recess with its enlarged end uppermost, said wedge being free in said recess for longitudinal movement therein and to gravitate to its lowermost position, a collar on said shaft with which the inner arcuate face of said wedge is frictionally engageable to effect inter-engagement between said shaft and ring on retrograde movement of said shaft, a slide bar, connections between said slide bar and the brake rock shaft, means on said ring engageable with said slide bar for shifting the latter on turning said ring under the influence of said drive shaft, and means carried by said ring for lifting said wedge out of operative relation to said collar and ring.

5. In a vehicle safety brake in association with the vehicle brake operating rock shaft and the vehicle drive shaft, a ring loosely encircling the drive shaft having a tapered recess on its inner periphery and arranged with its enlarged end extending upwardly above the shaft and its reduced end extending downwardly below the shaft, an arcuate tapered wedge arranged in said recess with its enlarged end uppermost, said wedge being free in said recess for longitudinal movement therein and to gravitate to its lowermost position, a collar on said shaft with which the inner arcuate face of said wedge is frictionally engageable to effect inter-engagement between said shaft and ring on retrograde movement of said shaft, a slide bar, connections between said slide bar and the brake rock shaft, means on said ring engageable with said slide bar for shifting the latter on turning said ring under the influence of said drive shaft, means carried by said ring for lifting said wedge out of operative relation to said collar and ring, a slide bar associated with the vehicle reverse mechanism, and means actuated by said slide bar for placing said wedge out of operative relation to said collar and ring.

6. In a vehicle safety brake, a vehicle drive shaft, a collar on said shaft having a peripherial channel, a ring loosely encircling said collar having a recess on its inner periphery extending substantially one-half the circumference of said collar from the upper to the lower portion thereof, said recess having an arcuate wall and being longitudinally tapered and having its enlarged end uppermost, an arcuate tapered wedge arranged in said recess having an arcuate inner periphery conforming to the bottom wall of the channel in said collar and having an arcuate outer periphery conformable to the arcuate wall of said recess, a vehicle brake rock shaft, a slide bar, connections between said slide bar and shaft, and means on said ring for shifting said slide bar in one direction to turn said brake shaft.

7. In a vehicle safety brake, a vehicle drive shaft, a collar on said shaft having a peripherial channel, said channel and wedge having wedge shaped cross sections, a ring loosely encircling said collar having a recess on its inner periphery extending substantially one-half the circumference of said collar from the upper to the lower portion thereof, said recess having an arcuate wall and being longitudinally tapered and having its enlarged end uppermost, an arcuate tapered wedge arranged in said recess having an arcuate inner periphery conforming to the bottom wall of the channel in said collar and having an arcuate outer periphery conformable to the arcuate wall of said recess, a vehicle brake rock shaft, a slide bar, connections between said slide bar and shaft, and means on said ring for shifting said slide bar in one direction to turn said brake shaft.

8. In a vehicle safety brake, a collar fixed on the vehicle drive shaft, said collar having a peripherial channel of wedge shaped cross section, a ring loosely encircling said collar having a recess on its inner periphery extending from the upper portion of said collar downwardly to the underside thereof, said recess being tapered longitudinally and having its enlarged end uppermost, an arcuate wedge floating in said recess with its enlarged end uppermost, the outer arcuate margin of said wedge and the contiguous wall of said recess conforming to each other, the inner peripheral portion of said wedge and the walls of the channel in said collar conforming to each other, a spring for holding said ring against rotation in one direction, fixed means limiting turning of said ring in the other direction, and means actuated by turning of said ring in opposition to said spring for applying the brakes of the vehicle.

9. In a vehicle safety brake, a collar fixed on the vehicle drive shaft, said collar having a peripherial channel of wedge shaped cross section, a ring loosely encircling said collar having a recess on its inner periphery extending from the upper portion of said collar downwardly to the underside thereof, said recess being tapered longitudinally and having its enlarged end uppermost, an arcuate wedge floating in said recess with its enlarged end uppermost, the outer arcuate margin of said wedge and the contiguous wall of said recess conforming to each other, the inner peripheral portion of said wedge and the walls of the channel in said collar conforming to each other, a spring for holding said ring against rotation in one direction, fixed means limiting turning of said ring in the other direction, means actuated by turning of said ring in opposition to said spring for applying the brakes of the vehicle, and means carried by said ring engageable with said wedge to lift the latter.

MARK S. GRAVES.